US007761363B2

(12) United States Patent
Penney

(10) Patent No.: US 7,761,363 B2
(45) Date of Patent: Jul. 20, 2010

(54) INTERNAL TRADE REQUIREMENT ORDER MANAGEMENT AND EXECUTION SYSTEM

(75) Inventor: Neill Penney, Surrey (GB)

(73) Assignee: FX Alliance, LLC, New York, NY (US)

(*) Notice: Subject to any disclaimer, the term of this patent is extended or adjusted under 35 U.S.C. 154(b) by 1258 days.

(21) Appl. No.: 10/959,401

(22) Filed: Oct. 7, 2004

(65) Prior Publication Data

US 2005/0114257 A1   May 26, 2005

Related U.S. Application Data

(60) Provisional application No. 60/509,251, filed on Oct. 8, 2003.

(51) Int. Cl.
*G06Q 40/00* (2006.01)
(52) U.S. Cl. ........................................ 705/37
(58) Field of Classification Search .............. 705/37
See application file for complete search history.

(56) References Cited

U.S. PATENT DOCUMENTS

| 4,677,552 | A | 6/1987 | Sibley, Jr. |
| 4,903,201 | A | 2/1990 | Wagner |
| 5,077,665 | A | 12/1991 | Silverman et al. |
| 5,258,908 | A | 11/1993 | Hartheimer et al. |
| 5,262,942 | A | 11/1993 | Earle |
| 5,375,055 | A | 12/1994 | Togher et al. |
| 5,758,328 | A | 5/1998 | Giovannoli |
| 5,761,386 | A | 6/1998 | Lawrence et al. |
| 5,787,402 | A | 7/1998 | Potter et al. |
| 5,794,234 | A * | 8/1998 | Church et al. ............ 707/4 |
| 5,819,237 | A | 10/1998 | Garman |
| 5,855,008 | A | 12/1998 | Goldhaber et al. |

(Continued)

FOREIGN PATENT DOCUMENTS

WO    WO-03019436    3/2003

OTHER PUBLICATIONS

Addison, E.R., "Using news understandings and neural networks in foreign currency options trading," available at http://ieeexplore.ieee.org/search97/s97is.vts? cti n= iew& dk gwKey=http%3A%2 %2 j . . . (Aug. 27, 2001) Abstract.

(Continued)

*Primary Examiner*—Stefanos Karmis
*Assistant Examiner*—Jessica L Lemieux
(74) *Attorney, Agent, or Firm*—Grady L. White, Esq.; Law Offices of Grady L. White, LLC

(57) ABSTRACT

The present invention provides an order management and execution system and computer-implemented method for managing orders in an environment where the customer may utilize internal accounting and trading procedures that require filling a number of internal and external trading requirements for a number of internal and external trading accounts. The invention, which may be used in a variety of different trading contexts and for a variety of asset classes, automatically converts the internal trading requirements to external trading requirements and builds external orders, which are optionally netted and executed in the market using an asset trading execution system. Then the invention automatically converts the executed external requirements back to the appropriate internal requirements, records the internal requirements as filled, and optionally downloads the appropriate execution completion records to the customer's trading system.

60 Claims, 5 Drawing Sheets

U.S. PATENT DOCUMENTS

| | | | |
|---|---|---|---|
| 5,890,140 | A | 3/1999 | Clark et al. |
| 5,897,621 | A | 4/1999 | Boesch et al. |
| 5,924,082 | A | 7/1999 | Silverman et al. |
| 5,924,083 | A | 7/1999 | Silverman et al. |
| 5,963,923 | A | 10/1999 | Garber |
| 5,978,485 | A | 11/1999 | Rosen |
| 6,014,627 | A | 1/2000 | Togher et al. |
| 6,016,483 | A | 1/2000 | Rickard et al. |
| 6,029,146 | A | 2/2000 | Hawkins et al. |
| 6,058,378 | A | 5/2000 | Clark et al. |
| 6,078,906 | A * | 6/2000 | Huberman .................. 705/37 |
| 6,088,685 | A | 7/2000 | Kiron |
| 6,134,535 | A | 10/2000 | Belzberg |
| 6,141,653 | A | 10/2000 | Conklin et al. |
| 6,205,433 | B1 | 3/2001 | Boesch et al. |
| 6,247,000 | B1 | 6/2001 | Hawkins et al. |
| 6,260,025 | B1 | 7/2001 | Silverman et al. |
| 6,278,982 | B1 | 8/2001 | Korhammer et al. |
| 6,304,858 | B1 | 10/2001 | Mosler et al. |
| 6,421,653 | B1 | 7/2002 | May |
| 6,560,580 | B1 | 5/2003 | Fraser et al. |
| 6,629,081 | B1 | 9/2003 | Cornelius et al. |
| 6,766,304 | B2 | 1/2004 | Kemp, II et al. |
| 6,772,132 | B1 | 8/2004 | Kemp, II et al. |
| 6,807,635 | B1 | 10/2004 | Kleckner |
| 7,225,153 | B2 * | 5/2007 | Lange ........................ 705/37 |
| 7,430,531 | B1 * | 9/2008 | Snyder ....................... 705/35 |
| 7,516,103 | B1 * | 4/2009 | Peitrucha et al. ............. 705/56 |
| 2001/0044771 | A1 | 11/2001 | Usher |
| 2002/0091624 | A1 | 7/2002 | Glodjo et al. |
| 2002/0143689 | A1 * | 10/2002 | Naylor et al. ................. 705/37 |
| 2003/0069836 | A1 | 4/2003 | Penney |
| 2003/0139997 | A1 | 7/2003 | Ginsberg |
| 2003/0149653 | A1 | 8/2003 | Penney |
| 2004/0039689 | A1 | 2/2004 | Penney |
| 2004/0143539 | A1 | 7/2004 | Penney |
| 2004/0267655 | A1 * | 12/2004 | Davidowitz et al. ........... 705/37 |

OTHER PUBLICATIONS

Enhanced Market Access: Evolving the Wheel, http://www.currency.com/misc./wp-ema.pdf (Aug. 11, 2003).

Galileo International Introduces New Viewpoint (TM) Software, PR Newswire, p. 01651 (3 pages) (Nov. 9, 1999).

going with the flow, banking technology online, available at http://www.bankingtech.com/online/features/2001/m y.html (Aug. 28, 2001).

Gresh, D.L. et al., "An interactive framework for visualizing foreign currency exchange options," available at http://ieeexplore.ieee.org/search97/s97.is.vts? cti n=iew& dk gwKey=http%3A%2 %2 j . . . (Aug. 27, 2001).

Instant Web Trading available at http://www.cognotec.com/service/index.html (Aug. 11, 2003).

Izumi, K. et al., "An artificial market analysis of exchange rate dynamics," Evoluntary Programming V. Processings of the Fifth Annual Conference on Evoluntary Programming, p. 27-36 (1996) (Abstract).

Kaizoji, Taisei, "A Synergetic Approach to Speculative Price Volatility," SAC '99, p. 57-65 (1998).

Kim, Lau Sim, "Towards an intelligent BOSS," Proceedings of the First Singapore International Conference on Intelligent Systems (SPICIS '92), p. 313-317 (1992) (Abstract).

Klopfenstein, G., "A random walk in chaos," Banking Technology, 10(5): 26-8, (Jun. 1993) (Abstract).

O'Callaghan, D., "Straight Through to the Portal [foreign exchange trading]," Banking Technology, 18(4): 36-40 (May 2001), Abstract.

Parikh, Satu S. et al., "Electronic futures markets versus floor trading: Implications for interface design," available at http://www.com.rg/pubs/articles/proceedings/chi/223904/p296-parikh.html (Aug. 27, 2001).

Prasolov, A.V. et al., "On forecast of exchange rate of a foreign currency," available at http://ieeexplore.ieee.org/search97/s97is.vts?.

Reuters: Products & Services, Sales & Trading—Treasury available at http://about.reuters.com/productinfo/treasury.asp?seg=1 (Aug. 11, 2003).

Riggs gets the personal touch [bank business operations], Financial Technology Bulletin, 19(3): 4 (Jun. 14, 2001) (Abstract).

Simms, M., "Portfolio vendors promote STP with increasingly open product offerings," Wall Street & Technology suppl. issue, p. 18, 20, 22, 24-5 (Feb. 2001) (Abstract).

www.fxgame.com, FXGame—Currency Trading Game, available at http://fxgame.oanda.com (Aug. 27, 2001).

* cited by examiner

INTERNAL TRADE REQUIREMENT ORDER MANAGEMENT AND EXECUTION SYSTEM

CROSS-REFERENCE TO RELATED APPLICATIONS

This application is related and claims priority under 35 U.S.C. §119 to provisional application No. 60/509,251, filed on Oct. 8, 2003, which is incorporated herein in its entirety by this reference.

FIELD OF ART

The present invention relates generally to computerized online asset trading execution systems and more particularly to order management systems and order management functions associated with asset trading execution systems.

RELATED ART

In today's global economy, investors, borrowers, lenders, buyers and sellers exchange (or "trade") millions of dollars worth of assets, including, for example, cash, securities, merchandise, commodities and precious metals, on a daily basis. In the foreign exchange ("FX") market, for example, participants agree to trade cash in one type of currency for cash in another type of currency for a specified price on a specified date. These agreements, which are collectively referred to as FX market instruments, include, for example, spot, forward (or forward outright) and swap contracts (defined below). In the money markets, participants make agreements to borrow and lend cash at a specified rate for a specified period of time. These agreements, which are collectively referred to as money market instruments, include certificates of deposit (CDs), repurchase agreements, treasury bills (T-bills), commercial paper, forward rate contracts, interest rate futures and interest rate options.

The borrowers, lenders, buyers and sellers trade these assets through asset dealers, who are sometimes referred to as "liquidity providers," or "market makers." In a typical scenario, a customer wishing to buy, sell, lend or borrow some quantity of assets will propose a transaction by sending a request for price quotes (sometimes through an intermediary party, such as a broker) to one or more of the liquidity providers. The liquidity providers respond by submitting quotes to the customers indicating at what prices the providers are willing to buy (or borrow) the assets, as well as what prices they are willing to sell (or lend) the assets. The buying or borrowing price is known as the "bid," and the selling or lending price is known as the "offer." The difference between the bid price and offer price is known as the "bid-offer spread," and it is this spread which generates profits for the liquidity providers, since they are always buying and borrowing slightly more cheaply than they are selling and lending.

Automated asset trading systems have been introduced to facilitate faster, more efficient and, for auditing purposes, more traceable, trading transactions between customers and providers. Typically, these systems comprise a customer trading program (or, in some instances, a suite of trading programs) running on a customer's computer system (or network), which receives input from the customer and sends trading requirements to one or more trading programs running on the providers' computer systems (or networks). Typically, the provider's computer systems respond to the customer's trading requirements in real time by transmitting price quotes for the requirements to the customer's computer system. In some cases, however, the providers' computer systems are configured to transmit price quotes for certain kinds of assets to the customer's computer system in a continuous or substantially continuous data stream. The customer's trading system may be configured to receive and display on the customer's monitor the best and/or most appropriate price quotes received for the stated trading requirements, and then, responsive to the customer's selection of the winning quote or a winning provider, transmit back to the provider's computer system an instruction to go ahead and execute the appropriate trades to fill those requirements.

The customer's computer system and the providers' computer systems talk to each other by exchanging a series of messages on one or more data communication channels established within an interconnected computer network, such as the Internet, a dedicated wide area network (WAN), or a corporate intranet. The messages carrying the providers' quotes and customers trading instructions may be channeled through an intermediate or centralized asset trading execution system (or "trading portal") connected to the interconnected computer network. Typically, the intermediate asset trading execution system is configured to coordinate, compare, match, error-check and/or log the messages on behalf of the customers and liquidity providers. In some cases, the trading server is managed and operated by a third party. FX Alliance, LLC of New York, N.Y. (FXall) is one example of a third party operator of an automated asset trading execution system for the FX market.

The customer's trading system typically includes an automated order management system (OMS), which accepts trading orders and instructions from the customer and uploads the orders and instructions to the asset trading execution system for pricing and execution. Once a deal is executed, the OMS is typically updated with the execution rate for each deal. Thus, the OMS maintains a record of deals that a customer needs to have executed in the market, the deals that have already been executed in the market, the entities requesting the deal executions, the providers who executed the deals, etc. This kind of end-to-end computer-automated processing of trades is called "straight-through processing."

It has been found, however, that existing order management systems are not capable of handling some of the more complex internal accounting practices and asset trading procedures used by a growing number of companies. There are a growing number of companies, for example, which, for accounting reasons, split their assets up internally among a number of different internal entities; but, when trading on the open market, they do so as a single or perhaps just a few recognized trading entities. Some companies, for example, have multiple subsidiaries, divisions, offices, departments or branches, which, at any given time, have independently-generated asset trading requirements. Rather than have every one of these branches or departments trying to execute its own trades in the market, these companies are able to exercise greater buying power, and thereby obtain better overall prices on the market, and incur significantly fewer fees and expenses by using a centralized "corporate treasurer" model for trading assets. In the corporate treasurer model, a single office or branch has the responsibility of collecting many, if not all, of the company's internal asset trading requirements, translating and/or aggregating the internal trading requirements into one or more external trading requirements, executing the appropriate trades on the open market to fill the external requirements, and then distributing the proceeds of the executed external trades to the appropriate internal accounts associated with each of the branches or departments.

In another example, there are some fund managers who hold more internal trading accounts than they actually use on the open market. For instance, a fund manager for a university, who has responsibility for managing all of the fund assets of the entire university, may nevertheless always trade on the open market under a single external account, which is typically named, for example, after the university. Internally, however, the fund assets are split up into many different internal funds across many different accounts.

Consequently, large companies, universities and other organizations will typically track and manage two accounting systems: an external accounting system, comprising one or more external trading accounts, where the external trades are settled, as well as an internal accounting system, comprising a multiplicity of internal trading accounts, where all of the internal orders are settled.

The existing order management systems require a considerable amount of additional work for companies and organizations that use both internal and external accounting systems because all of the translations, aggregation, conversion and internal allocations required for dealing with and mapping all of the internal and external trades must be manually and separately performed before and after the trades are executed in the market. Thus, the companies and organizations must: (1) collect all of the internal trading requirements; (2) figure out how to satisfy the internal trading requirements in the market by converting each internal trading requirement into an external trading requirement (keeping track of the relationships between the internal and external requirements); (3) add up all of the external trading amounts (a process called "netting"); (4) execute deals on the open market to fill all of the external trading requirements; and (5) apply (or copy) all of the execution rates obtained for the executed external deals to internal deals to fill all of the internal trading requirements. Except for executing the external trades on the market, all of these steps must be performed manually, which significantly reduces the overall benefit of straight-through processing.

SUMMARY OF THE INVENTION

The present invention addresses the above-described problems by providing an order management system and a method for managing orders in an environment that uses both internal and external trading accounts. In general, the invention comprises an order management system for executing trades, comprising an order generator, an order executer and an order completer. The order generator receives from a customer an "internal account trading requirement" for an "internal account," translates the internal account trading requirement into a "holder account trading requirement" for a "holder account," and builds an external order based on the holder account trading requirement.

An "internal account" is an account used for allocation of funds internally within the customer. Internal accounts, unlike "external accounts" (defined below), are meaningful only to the customer and are not known to, or recognized by, the provider or the outside world. An "external account" is a trading account recognized by both the customer and the provider. External accounts usually have a distinct set of physical bank accounts associated with them for physical settlement of funds. Requirements for a particular internal account are usually traded with the provider using the same external account. This external account is known as a "holder account" for the internal account. Note that the provider, being unaware of the existence of internal accounts, is also not aware that a particular external account has a role as a holder account. An external order is an order to fill the requirements associated with an external account or a holder account. As discussed in more detail below, several internal account requirements may be grouped together (i.e., "netted"), based on a customer-specified preference, to form a single external order.

The order management system of the present invention is preferably linked to an online asset trading execution system, so that the order executor retrieves, via the asset trading execution system, a set of price quotes for the external order from a set of provider candidates. The order executor transmits the price quotes to the customer and, responsive to the customer's selection of a winning provider, causes the external order to be filled. Then the order completer records two executed deals. The first executed deal, which fills the external order, is between the holder account and the winning provider. The second executed deal fills the internal requirements and is between the holder account and the internal account. Preferably, although not necessarily, the order executor also nets together all of the requirements for the same holder accounts prior to generating the external order and transmitting a request for quotes to the asset trading execution system.

In another aspect of the invention, there is provided a computer-implemented method for processing trade requests, comprising the steps of (1) receiving an internal account trading requirement for an internal account; (2) translating the internal account trading requirement into a holder account trading requirement for a holder account; (3) building an external order based on the holder account trading requirement; (4) transmitting a set of price quotes for the external order to the customer; (5) causing the external order to be filled responsive to the customer's selection of a winning provider; and (6) recording two executed deals comprising a first executed deal between the holder account and the winning provider, and a second executed deal between the holder account and the internal account. The first executed deal corresponds to the filled external order and the second executed deal fills the internal account trading requirements.

Preferred embodiments of the invention are also capable of filling external account trading requirements, i.e., those external trading requirements that are not associated with (or derived from) any internal account trading requirements. Therefore, the invention may further comprise system components and method steps for: (7) receiving an external account trading requirement for an external account; (8) building a market order based on the external account trading requirement; (9) transmitting to the customer a price quote responsive to the market order; (10) receiving the customer's selection of a second winning provider for the market order price quotes; (11) causing the market order to be filled by the second winning provider; and (12) recording a third executed deal between the second winning provider and the external account. The second winning provider may or may not be the same provider as the provider selected for the external orders associated with internal trading requirements.

The external requirements, both those associated with internal requirements and those without corresponding internal account requirements, may be netted together to form fewer external orders prior to requesting, receiving and presenting to the customer responsive price quotes. Thus, the invention may be configured to use one of at least three netting options. The first option is to net together all of the requirements for the same holder accounts, and to further group the requirements for all external accounts into a single order. The second option is to not group together the requirements for the same holder account, but to group all external requirements into a single order. The third option is to not apply any netting or grouping, and to treat all external requirements as separate orders.

Among other things, the invention features automatic conversion of internal trading requirements to external (or "market") trading requirements, automatic netting of requirements, preferably based on the customer's accounting preferences, a connection to an asset trading execution system for filling the external trading requirements, and then automatic calculation of the execution rate for the internal trading requirements. An optional feature of the invention is that it can also add a spread to the internal deal execution rates.

Together, these features provide significant advantages over existing order management systems in terms of time, effort and costs associated with managing and executing trades in a variety of different asset trading contexts. Customers may quickly process both internal and external trading requirements automatically and therefore, are not required to perform the time-consuming and error-prone tasks of manually converting internal trading requirements to external trading requirements and vice versa.

To illustrate the advantages of the invention, suppose, for example, that ABC Corp has a corporate treasurer responsible for collecting all of ABC Corp's internal trading requirements for all of ABC Corp's internal accounts from ABC Corp's branch offices and executing trades in the market to fill these internal trading requirements. For this reason, ABC Corp uses both internal and external trading accounts. External accounts are normal accounts in the sense that they are traded directly with providers. By contrast, internal accounts are not traded directly with providers, but in the name of a holder account. After using an online asset trading execution system to trade on a holder account, ABC Corp books two deals: the deal with the holder account and an internal back-to-back deal between the holder account and the internal account.

ABC Corp also may execute multiple requirements in a single order. In this case, internal requirements with the same holder account are netted into a single external requirement before sending the requirements to providers for pricing. This netting process reduces the number of confirmations between ABC Corp and the wining providers. Multiple back-to-back deals are then booked by the order management system of the present invention to split the netted 'block' across the set of internal requirements.

For example, suppose the trading requirements for ABC Corp's underlying internal and external accounts are as shown in Table 1 below:

TABLE 1

ABC Corp's Underlying Trade Requirements

| Account | Type | Holder | Requirement |
| --- | --- | --- | --- |
| BLPE | Internal | CWAC | Buy GBP 10,000 vs USD |
| BPOE | Internal | CWAC | Buy GBP 15,000 vs USD |
| BTRES | Internal | CWAC | Sell GBP 5,000 vs USD |
| CMCNG | Internal | CMM | Buy GBP 20,000 vs USD |
| CMCNGUK | Internal | CMM | Sell GBP 12,000 vs USD |
| IGCLUK | External | (N/A) | Sell GBP 5,000 vs USD |
| ICOE | External | (N/A) | Buy GBP 10,000 vs USD |

Using the present invention, the requirements for the internal accounts are translated into requirements for their corresponding holder account accounts, and multiple requirements for the same holder account are netted together. The result is the list of executable requirements shown in Table 2 below:

TABLE 2

Executable Requirements

| Account | Requirement |
| --- | --- |
| CWAC | Buy GBP 20,000 vs USD |
| CMM | Buy GBP 8,000 vs USD |
| IGCLUK | Sell GBP 5,000 vs USD |
| ICOE | Buy GBP 10,000 vs USD |

The executable requirements shown in Table 2, above, are then netted together into the single executable market order shown in Table 3 below:

TABLE 3

Netted Market Order

| Requirement | Account | Requirement |
| --- | --- | --- |
| Buy GBP 33,000 vs USD | CWAC | Buy GBP 20,000 vs USD |
| | CMM | Buy GBP 8,000 vs USD |
| | IGCLUK | Sell GBP 5,000 vs USD |
| | ICOE | Buy GBP 10,000 vs USD |

If BANK1 fills this order at 1.5600, then the following trades are entered and recorded by the order management system of the present invention:

TABLE 4

Recorded Executed Deals

| Counter-party 1 | Counter-party 2 | Deal |
| --- | --- | --- |
| CWAC | BANK1 | CWAC buys GBP 20,000 vs USD at 1.5600 |
| | | BANK1 sells GBP 20,000 vs USD at 1.5600 |
| CMM | BANK1 | CMM buys GBP 8,000 vs USD at 1.5600 |
| | | BANK1 sells GBP 8,000 vs USD at 1.5600 |
| IGCLUK | BANK1 | IGCLUK sells GBP 5,000 vs USD at 1.5600 |
| | | BANK1 buys GBP 5,000 vs USD at 1.5600 |
| ICOE | BANK1 | ICOE buys GBP 10,000 vs USD at 1.5600 |
| | | BANK1 sells GBP 10,000 vs USD at 1.5600 |
| BLPE | CWAC | BLPE buys GBP 10,000 vs USD at 1.5600 |
| | | CWAC sells GBP 10,000 vs USD at 1.5600 |
| BPOE | CWAC | BPOE buys GBP 15,000 vs USD at 1.5600 |
| | | CWAC sells GBP 15,000 vs USD at 1.5600 |
| BTRES | CWAC | BTRES sells GBP 5,000 vs USD at 1.5600 |
| | | CWAC buys GBP 5,000 vs USD at 1.5600 |
| CMCNG | CMM | CMCNG buys GBP 20,000 vs USD at 1.5600 |
| | | CMM sells GBP 20,000 vs USD at 1.5600 |
| CMCNGUK | CMM | CMCNGUK sells GBP 12,000 vs USD at 1.5600 |
| | | CMM buys GBP 20,000 vs USD at 1.5600 |

Note that both the externally executed deals and the back-to-back deals are recorded. The net result of booking these deals is that the original requirements are satisfied, while the two holder accounts have no net position.

To further illustrate the netting options available with the invention, suppose, for example, that ABC Corp has the following accounts and trading requirements:

| Account | Requirement |
| --- | --- |
| ACCT1 | $1mio |
| ACCT2 | $1mio |
| ACCT3 | $1mio |
| ACCT4 | $1mio |

-continued

| Account | Requirement |
|---------|-------------|
| ACCT5   | $1mio       |
| ACCT6   | $1mio       |

Suppose further that ABC Corp has set up the following relationships between the these accounts:

ACCT1 is an internal account associated with holder account EXT1;

ACCT2 is an internal account associated with holder account EXT1;

ACCT3 is an internal account associated with holder account EXT2;

ACCT4 is an internal account associated with holder account EXT2;

ACCT5 is an external account; and

ACCT6 is an external account.

These relationships may be set up for example, by populating databases, tables and/or spreadsheets on the customers' trading system, which are then encrypted and transmitted over a data communications channel to the order management system of the present invention. The translation of the internal account trading requirements to the external account trading requirements produces the following six requirements:

| Account | Requirements |
|---------|--------------|
| EXT1    | $1mio        |
| EXT1    | $1mio        |
| EXT2    | $1mio        |
| EXT2    | $1mio        |
| ACCT5   | $1mio        |
| ACCT6   | $1mio        |

Embodiments of the invention may be configured to use these external trading requirements in their current form or it may be configured to perform one of the three netting options described above. For example, using the first netting option for the example above (netting together all of the requirements for the same holder accounts, and further grouping the requirements for all external accounts into a single order) would result in executing one external order to fill four external requirements as shown below:

| Account | Requirements |
|---------|--------------|
| EXT1    | $2mio        |
| EXT2    | $2mio        |
| ACCT5   | $1mio        |
| ACCT6   | $1mio        |

Using the second netting option for the example above (not grouping together the requirements for the same holder account, but grouping all external requirements into a single order) would result in executing one external order to fill six external requirements. Using the third option for the example above (not applying any netting or grouping, and treating all external requirements as separate orders) would result in executing six external orders, each with one external requirement.

Executing, recording and settling a fewer number of external trades is typically less expensive for ABC Corp in terms of administrative costs, trading commissions and settlement fees. In all three cases, however, the order completer of the present invention will automatically perform all of the external to internal account mapping and conversions necessary to fill all of the requirements for all six of the accounts.

DEFINITION OF TERMS

As used in this description, except to the extent that the context indicates otherwise, the following terms may be understood with reference to the definitions provided below.

FX Terms

A "foreign exchange" or "FX" transaction (or "deal") is a contract to exchange one currency for another at an agreed rate on a specified delivery date, also called a "value date" or "settlement date."

A "value date" or "settlement date" is the date on which the actual exchange of currencies will take place.

Parties

The term "Provider" is typically a shorthand reference to a "Liquidity Provider." A "Liquidity Provider" is typically a financial institution, such as a bank, that serves as a market maker in a trading system. Liquidity Providers quote prices in response to requests from "Customers."

The term "bank," as used herein, is typically interchangeable with the term "Provider."

The terms "dealer," "trader" and "treasurer" typically refer to employees of the bank or Liquidity Provider who monitor the Liquidity Provider's trading system and respond to requests for price quotes and offers to make deals as they are received from Customers.

The term "Customer" typically refers to the party in a trading transaction who wishes to buy or sell assets and who is not a Provider or employee of a Provider. Customers initiate the dealing process by asking one or more Providers for a price on a particular FX instrument, such as a swap, forward or spot agreement. The term "Customer" may also refer to an aggregation of users, as, for example, in a company.

RFQ=Request For Quote. A trading protocol whereby the Customer initiates a trade by asking one or more Providers (sometimes through an intermediary, such as the operator of an online electronic trading platform or server) for a price quote on a particular asset. The Provider typically responds by sending a price back to the Customer (or the intermediary). In order to take the price, the Customer typically sends the Provider a message indicating a desire to deal on the quote, which is typically referred to as an "offer" or an "offer to deal." Upon receipt of the offer or offer to deal, the Provider typically sends back a "confirmation" message, which may an acceptance or rejection of the offer to deal.

mio=million.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include exemplary embodiments of some of the various forms of the invention. In these drawings.

DETAILED DESCRIPTION OF PREFERRED EMBODIMENTS

The present invention provides an apparatus and method for trading assets in a variety of different trading contexts and under a variety of trading protocols, where trading requirements must be satisfied for both external and internal trading accounts. The following detailed description of preferred embodiments refers primarily to foreign exchange (FX) trades and assets comprising foreign exchange (FX) instruments. However, these references are only meant to illustrate, by way of example, how the invention may be made and practiced in the context of the foreign exchange instrument asset class; not to serve as a limitation on the applicability of the invention to other asset classes. Upon reading the detailed description that follows, it will be apparent to those skilled in the art that order management systems configured to operate according to the principles of the present invention would provide substantial benefits and advantages when trading assets of other classes, such as money market instruments and cash loans and deposits. Therefore, order management systems and methods used to trade assets that are not related to foreign exchange transactions are not outside the scope of the claimed invention.

Figure 1:
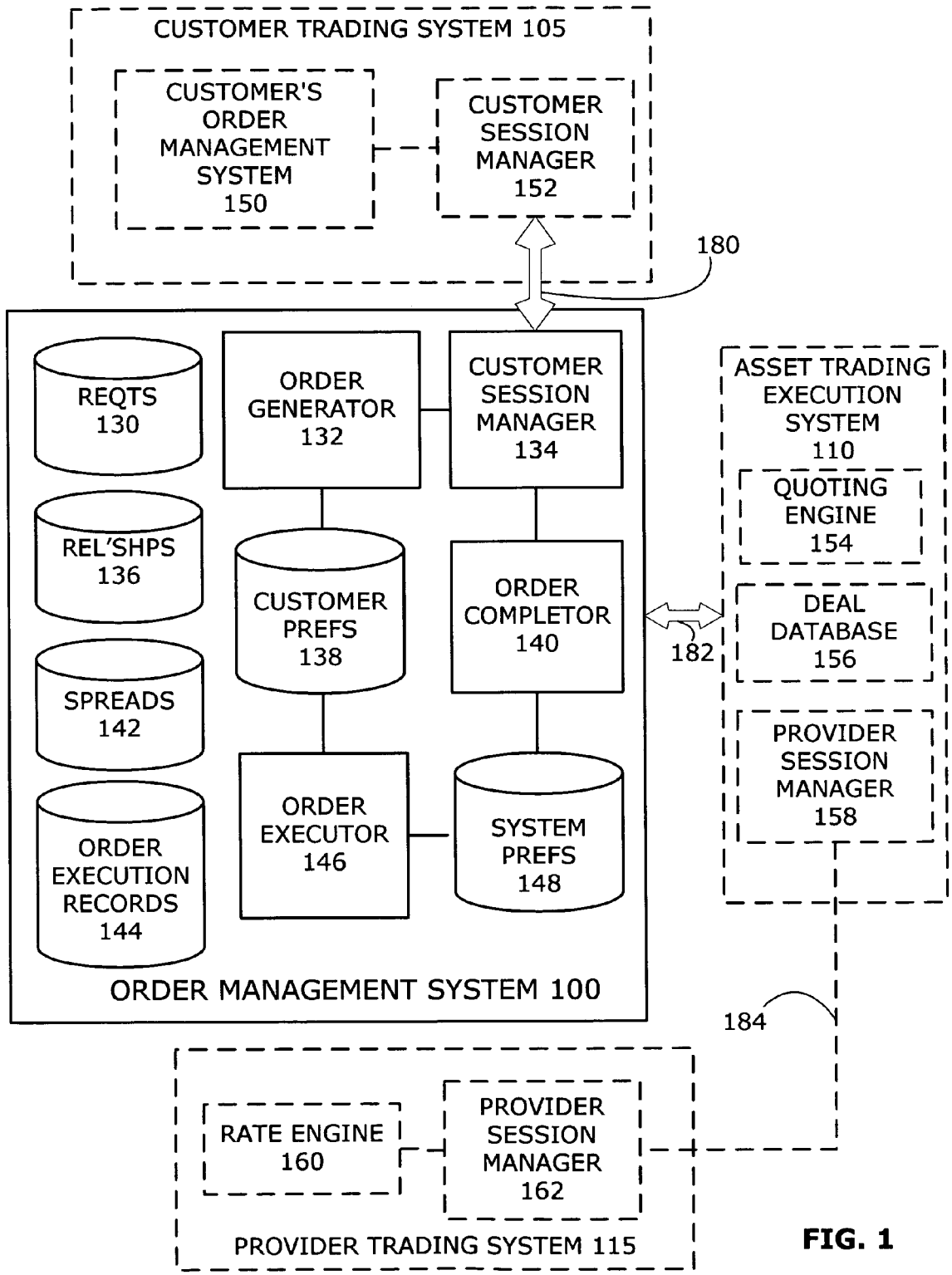
FIG. 1 shows a high-level block diagram of an order management system configured to operate according to one embodiment of the present invention.

FIG. 1 shows a high-level block diagram of the major functional components of an order management system configured to operate according to an illustrative embodiment of the present invention. As shown in FIG. 1, order management system 100 comprises an order generator 132, an order executor 146 and an order completer 140. Optional embodiments of the invention also comprise a customer preferences database 138, a system preferences database 148, a requirements database 130, a relationships database 136, a spreads database 142, an order execution records database 144 and a customer session manager 134. As illustrated by the drawing of FIG. 1, the invention may be coupled to a customer trading system 105 via a customer communications interface (shown in FIG. 1 as link 180). The invention may also be coupled to an asset trading execution system 110 by another data communications connection or interface (shown in FIG. 1 as link 182). Typically, asset trading execution system 110 is connected to a provider trading system 115, via a third communications link (shown in FIG. 1 as link 184), which streams price quotes (or otherwise provides price quotes on request) to asset trading execution system 110.

The term "RFQ" means "Request for Quote," which is a trading protocol whereby the Customer initiates a trade by asking one or more Providers (sometimes through an intermediary, such as the operator of an online electronic trading platform or server) for a price quote on a particular asset. The Provider typically responds by sending a price back to the Customer (or the intermediary). In order to take the price, the Customer typically sends the Provider a message indicating a desire to deal on the quote, which is typically referred to as an "offer" or an "offer to deal." Upon receipt of the offer or offer to deal, the Provider typically sends back a "confirmation" message, which may an acceptance or rejection of the offer to deal.

Some of the trading requirements may need to settle into internal accounts and some may need to settle into external accounts. Order generator 132 examines the trading requirements received from customer trading system 105, and, if they include internal account trading requirements, translates the internal account trading requirements into holder account trading requirements for one or more holder accounts. Order generator 132 creates and records a link representing the relationship between the holder account trading requirements and the internal account trading requirements. The internal account trading requirements are stored in requirements database 130 and the relationship link is stored in relationship database 136.

Order generator 132 then builds external orders based on the holder account trading requirements. In preferred embodiments order generator 132 builds the external orders according to a set of customer preferences, which may be supplied along with the internal account trading requirements, or otherwise retrieved from customer preferences database 138. The set of customer preferences may comprise, for example, a selection of one of the three netting options described above. Among other factors, the netting option selected by the customer will most likely depend on the customer's internal accounting regime. However, there are some jurisdictions where the selected netting option could depend on local or national accounting laws and practices associated with the customer.

The customer preferences may also comprise other customer-specified choices, such as a preferred provider candidate, a maximum price, a minimum order size, a settlement date restriction, a currency designation associated with the external order, the customer's location, a provider candidate's location, a funding amount associated with the external order, a provider candidate's transaction history, a service level agreement with one of the provider candidates, a business volume target associated with one of the provider candidates, or a provider candidate's observed performance record. The invention may be configured to use one of these customer-specified preferences, more than one, or all of them to build the external order.

In some cases, it may be advantageous to program the invention to ignore or override one, some or all of these customer-specified preferences in favor of more generic system preferences, which may be retrieved from system preferences database 148. The order management system of the present invention may be configured, for example, to use the system preferences only when no customer preferences are supplied by the customer, when the selected customer preferences are not available in the market, or when there is some kind of conflict with an important operating, trading or market condition. Alternatively, the order management system of the present invention may be configured so that the customer preferences always take precedence over a conflicting set of system preferences.

After the external orders are built, order executor 146 obtains price quotes for the external orders from a set of provider candidates as determined from potentially the same set of customer and/or system preferences. Order executer 146 obtains the price quotes from asset trading execution system 110 via interface link 182. Asset trading execution system 110 may be configured to receive the quotes from provider trading system 115, via link 184, in response to requests for quotes (RFQs) for specific orders. Alternatively, asset trading execution system 110 may be configured to select responsive price quotes from a substantially continuous stream of price quotes transmitted from certain providers. Order executor 146 transmits the price quotes to the customer via interface link 180 and, responsive to the customer's selection of a winning provider from the set of provider candidates, causes the external order to be executed on asset trading execution system 110.

When the external order is executed, order completer 140 records two executed deals. The first executed deal, which fills the external order, is between the holder account and the winning provider. The second executed deal fills the internal account trading requirements and is between the holder account and the internal account. Order completer 140 records the second executed deal by first examining each requirement in the executed external order, along with records in relationship database 136, to determine whether it fills any external requirements that have been linked to any pending internal requirements. If any such links exist, then order completer retrieves the appropriate internal requirements from requirements database 130 and copies into them the execution rate of the completed external requirements. In some embodiments, order completer 140 may retrieve an appropriate spread for the transaction from the spreads database 142 and add it to the execution rate obtained for the external order. The sum of is then assigned to the internal order. Finally, order completer 140 generates order execution records indicating that the internal and external trading requirements have been filled. These execution records may be stored in order execution database 144 and, at the appropriate time, downloaded to customer trading system 105 via interface 180.

Order executor 146 also may be configured to automatically select a "best quote" from the set of price quotes, based on a predefined criteria or authorization, thereby relieving the customer from always having to select the winning provider(s) for every external order. Manual execution and order routing is also possible. Thus, the customer also may choose to manually select provider candidates, manually submit RFQs to those candidates, and manually select winning providers for the external orders. Or, the customer may choose to route external orders to a single provider, exchange or other execution venue. Regardless of how or where the external orders are executed, the present invention adds significant advantages in the pre-execution and post-execution processing, by linking and filling of internal trade requirements.

Although requirements database 130, relationships database 136, customer preferences database 138, system preferences database 148, spreads database 142 and order execution records database 144 are shown in FIG. 1 as separate databases which all reside within order management system 100, it will be recognized and appreciated by those skilled in the art that the information contained in these databases may be combined and stored in a fewer number of databases, tables or spreadsheets, broken up and stored in a greater number of databases, tables or spreadsheets, or located on different computer systems attached to the computer system where order management system 100 resides without departing from the scope of the present invention. It will also be apparent that order management system 100 may optionally be located within customer trading system 105, within asset trading execution system 110, or within provider trading system 115.

Figure 2:
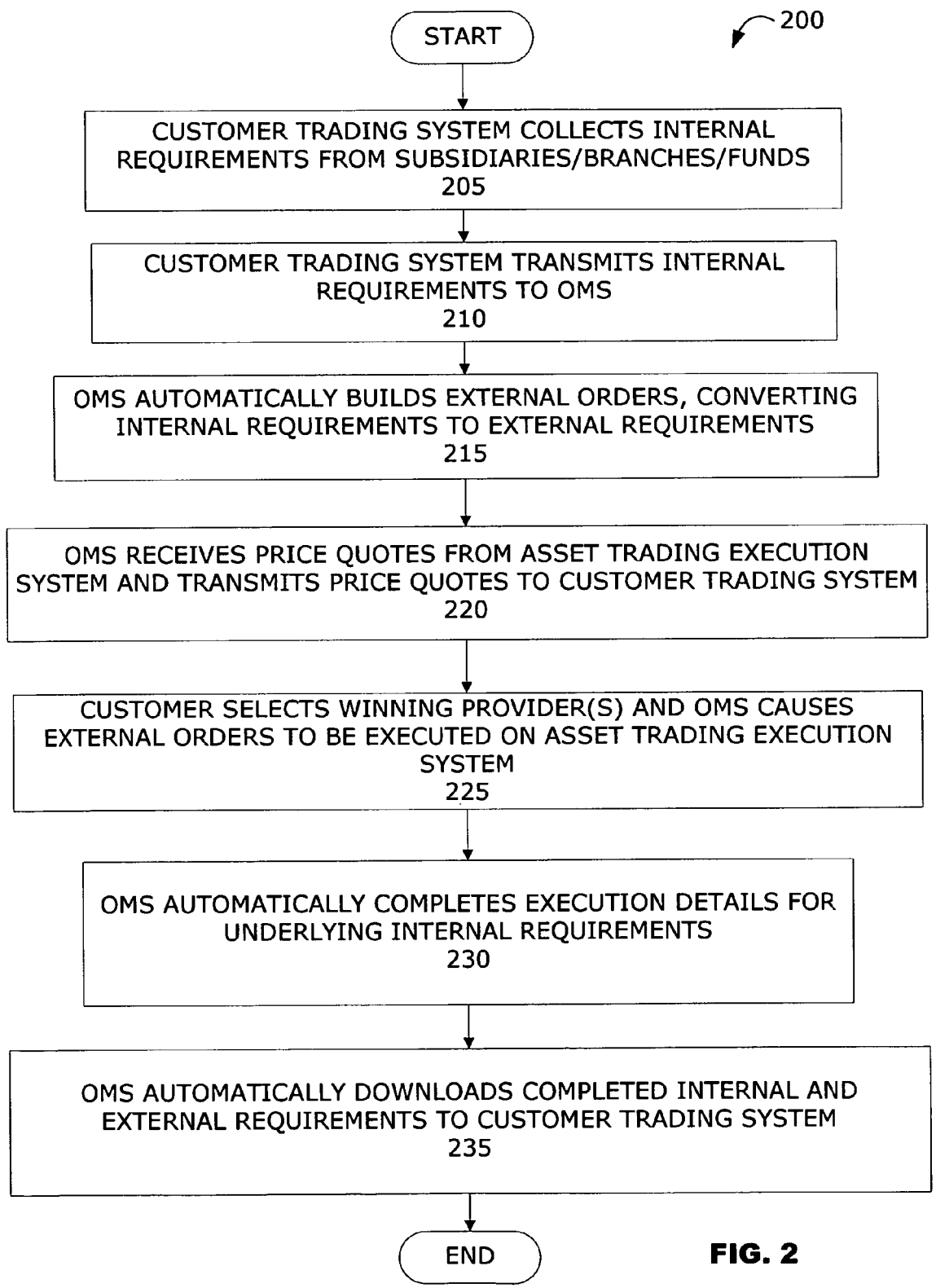
FIG. 2 contains a high-level flow diagram illustrating the overall algorithm that may be performed by embodiments of the present invention, such as the order management system shown in FIG. 1, to implement the invention.

Flow diagram 200 shown in FIG. 2 is a high-level flow diagram illustrating the overall algorithm that may be performed by embodiments of the present invention, such as the order management system shown in FIG. 1 and discussed above, to implement the invention. As shown in FIG. 2 at steps 205 and 210, a customer trading system (such as customer trading system 105 in FIG. 1) collects internal trading requirements from subsidiaries, branches and funds, and transmits the internal requirements to the order management system of the present invention (such as order management system 100 in FIG. 1). Next, at step 215, the order management system automatically builds external orders, converting internal requirements to external requirements. The order management system then receives (or, in the case of a price streaming system, may have already received) price quotes for the external orders (step 220).

The received price quotes are transmitted to the customers trading system (step 220), where they may be displayed to the customer via a customer user interface designed for the purpose of allowing the customer to select winning prices and/or winning providers. Next, at step 225, the customer selects the winning provider or winning providers for the external orders and the order management system causes those external orders to be executed. Typically, this is accomplished by sending the appropriate commands to an asset trading execution system, such as asset trading execution system 110 in FIG. 1.

When the system receives a confirmation from the asset trading execution system that the external orders have been executed, the order management system of the present invention automatically completes and records execution details for all of the underlying internal requirements (step 230). In other words, the system records all of the underlying requirements as being filled. And finally, the execution details for the filled internal and external requirements are downloaded to the customer's trading system.

Figure 3:
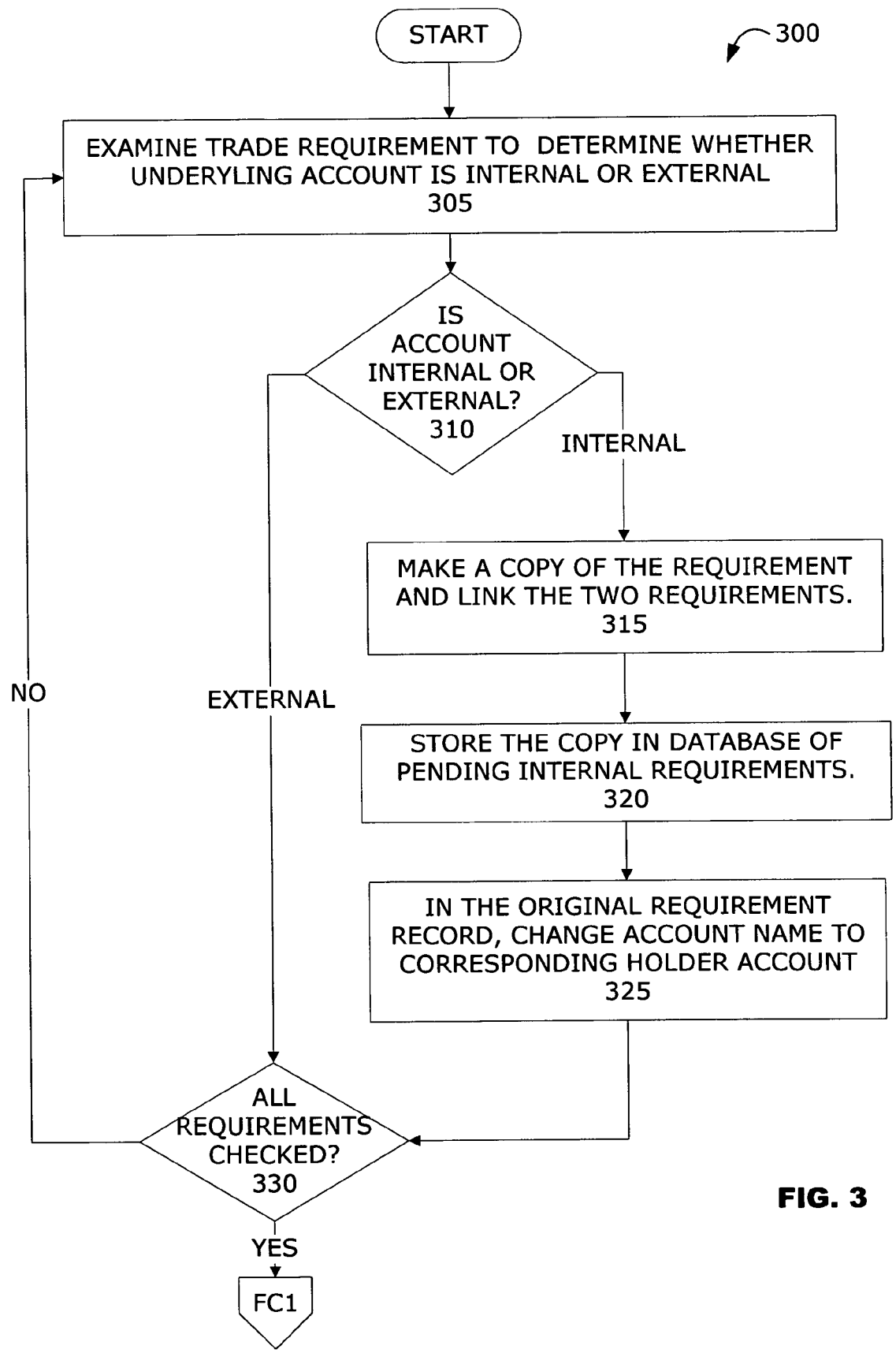
FIGS. 3 and 4 contain flow diagrams that show, at a more detailed level than FIG. 2, the steps that may be performed by embodiments of the present invention to build external orders.
Figure 4:
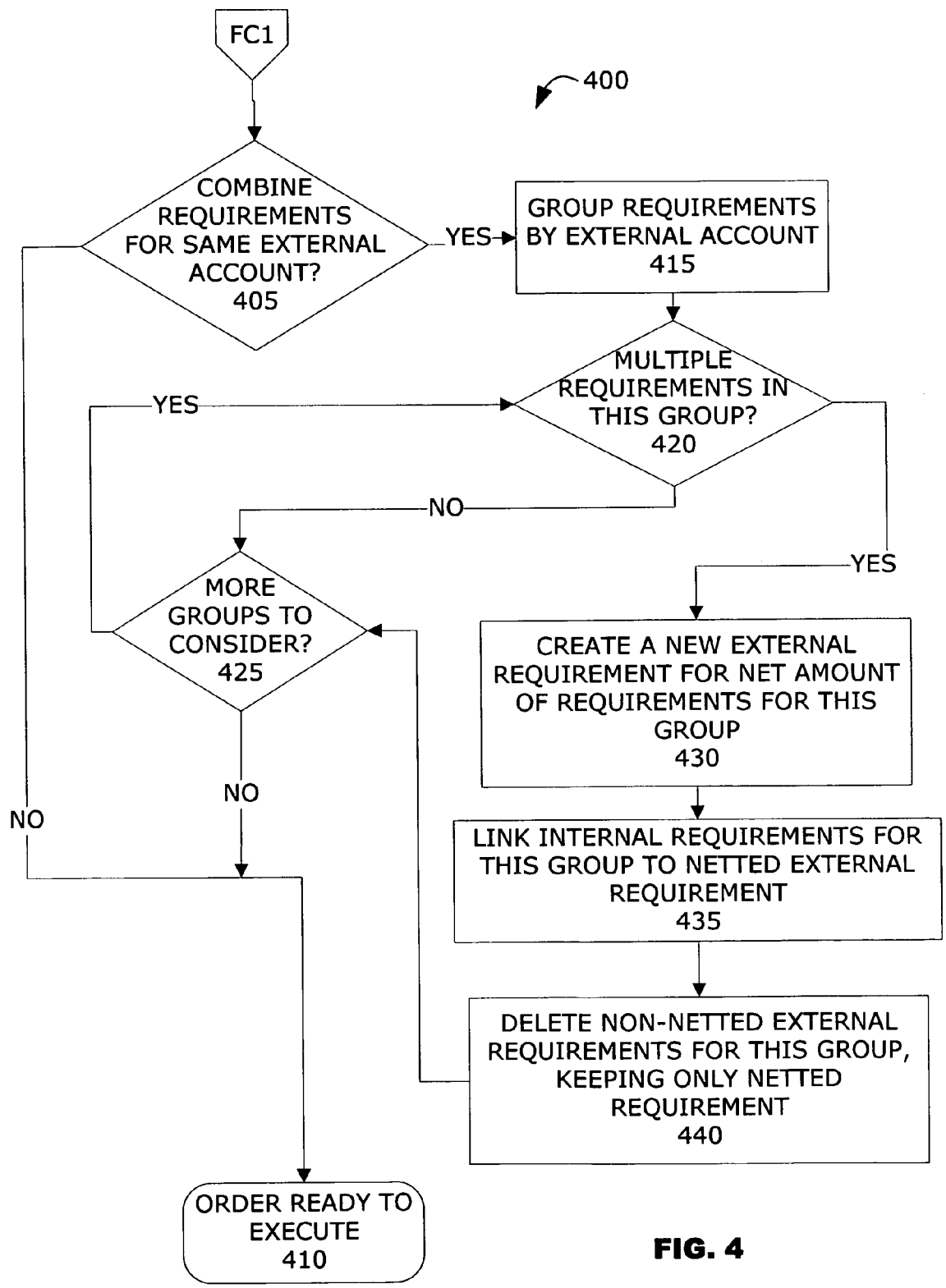
Figure 5:
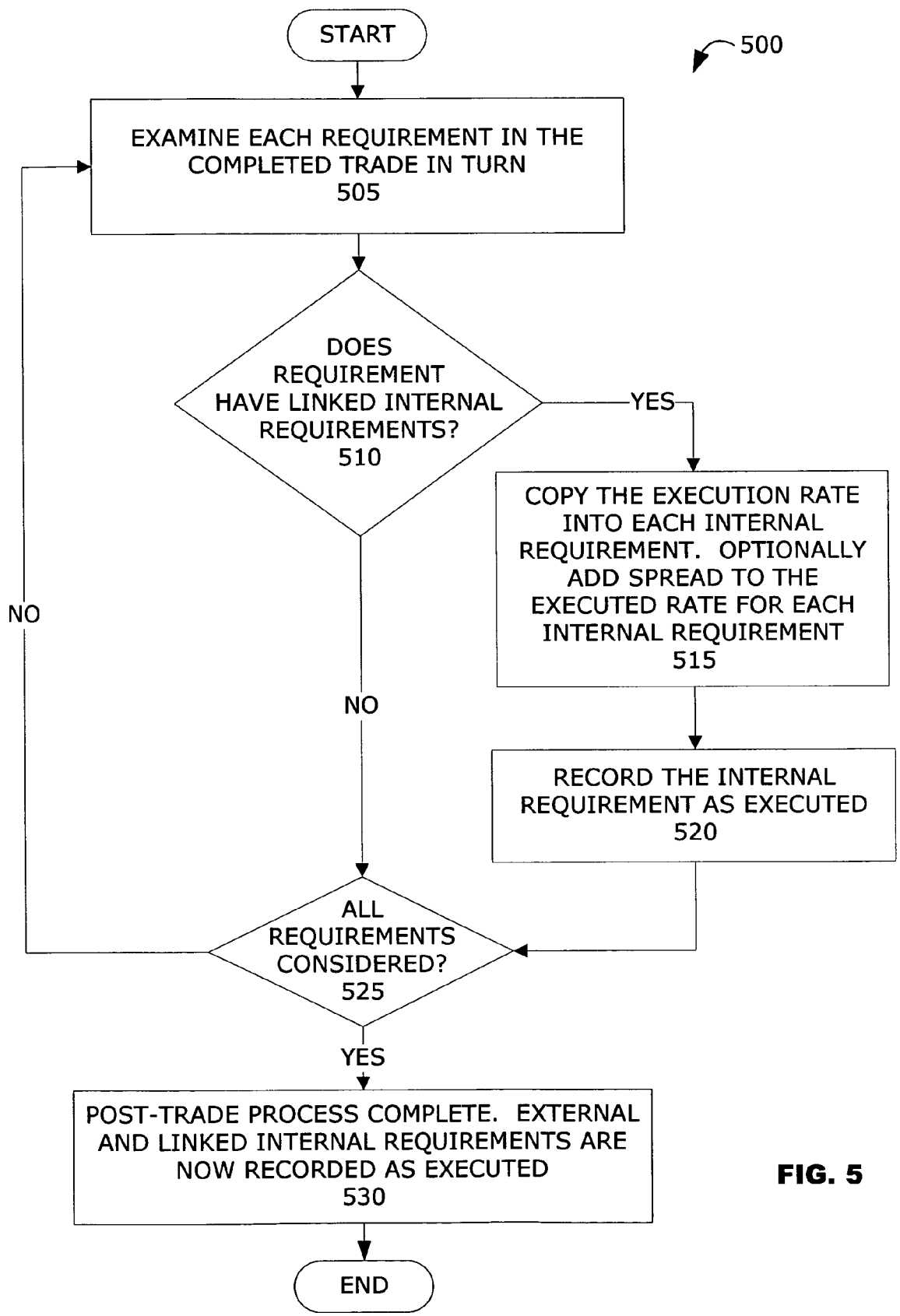
FIG. 5 contains another flow diagram, which illustrates, at a more detailed level than FIG. 2, the steps that may be performed by embodiments of the present invention to complete internal and external orders.

Referring now to FIGS. 3 and 4, flow diagrams 300 and 400 show, at a more detailed level than FIG. 2, the steps that may be performed by embodiments of the present invention to build the external orders. Typically, an order generator, such as order generator 132 shown in FIG. 1 and discussed above, performs these steps. First, at steps 305 and 310, trade requirements are examined to determine whether the underlying account for the trade is an internal account or an external account. Normally, a table or spreadsheet containing a list of all of the accounts associated with a particular customer, as well as the type of each account, is stored in the order management system or otherwise transmitted from the customer along with the trading requirements.

If it is determined at step 310 that the account is an external account, then nothing needs to be done for this account and processing continues at step 330, where the system determines there are additional requirements to be checked. If all of the requirements have not been checked, then processing returns to step 305, where the system checks the next trade requirement. If, on the other hand, it is determined at step 310 that the account is an internal account, then the system makes a copy of the requirement and creates a link between the original requirement and the copy (step 315). Next, at step 320, the system stores the copy of the requirement in a requirements database (such as, for example, requirements database 130 shown in FIG. 1). In the original requirement record, the account name is changed to a corresponding holder account (step 325). The system then determines, at step 330, whether all requirements have been checked and, if not, processing returns again to step 305, where the next requirement is checked.

When all of the requirements have been checked, processing continues as shown in flow diagram 400 pictured in FIG. 4 by way of flow chart connector FC1. At step 405, the system determines whether the external requirements should be netted. Whether netting should be used is largely a matter of customer preference. In some cases, however, a customer's desire or ability to net orders may depend primarily on the tax and accounting laws in effect where the customer is located. If the customer has specified that no netting is to be done, then the order is ready to execute and processing ends at step 410. If, on the other hand, the customer has specified that external orders should be netted, then all requirements for the same external accounts are grouped together (step 415) and the system checks to see if there are multiple requirements for the group (step 420). If there are no multiple requirements for this group, then processing continues at step 425, where the system checks to see if there are additional groups to consider. If it is determined at step 425 that there are no more groups to consider, then the order is ready to be executed (represented by step 410 in FIG. 4). If it is determined at step 425 that there are more groups to consider, then processing returns again to step 420, where the system looks at the next group to determine whether it contains multiple requirements. If a group does contain multiple requirements, then the system creates a new external requirement equivalent to the net amount of multiple requirements for the group (step 430) and links the internal requirements to the netted external requirement (step 435). Next, at step 440, the non-netted external requirements for the group are deleted, keeping only the netted requirement. Here again, the system checks to see if there are more groups to consider (step 425). When there are no more groups to consider, then all of the external orders are ready to be executed (step 410).

When the external order is executed, order completer 140 records two executed deals. The first executed deal, which fills the external order, is between the holder account and the winning provider. The second executed deal fills the internal account trading requirements and is between the holder account and the internal account. Order completer 140 records the second executed deal by first examining each requirement in the executed external order, along with records in relationship database 136, to determine whether it fills any external requirements that have been linked to any pending internal requirements. If any such links exist, then order completer retrieves the appropriate internal requirements from requirements database 130 and copies into them the execution rate of the completed external requirements. In some embodiments, order completer 140 may retrieve an appropriate spread for the transaction from the spreads database 142 and add it to the execution rate obtained for the external order. The sum of the spread and the execution rate for the external order is then assigned to the execution rate for the internal order. Finally, order completer 140 generates order execution records indicating that the internal and external trading requirements have been filled. These execution records may be stored in order execution records database 144 and, at the appropriate time, downloaded to customer trading system 105 via interface 180.

If the completed trade has a requirement that is linked to an internal requirement, then the execution rate for the external requirement is copied to the internal requirement (step 515). Optionally, a spread may be added to the execution rate. Next, the internal requirement is recorded as executed (step 520). Processing then continues at step 525, where the system checks to see whether there are additional requirements to be considered. If so, then processing returns to step 505, where the next requirement in a completed trade is examined. If not, then all external and linked internal requirements have been recorded as complete and the post-trade processing of internal and external requirements is complete (step 530).

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims. Therefore, for example, it should be understood by one skilled in the art that the present invention is not limited to foreign exchange transactions, and may be beneficially applied to other types of transactions as described above.

What is claimed is:

1. An order management system for executing trades, comprising:
    A database comprising records representing
        a set of one or more internal accounts for settling funds associated with internal trades, and
        a set of one or more holder accounts for settling funds associated with internal trades and external trades;
    an order generator processor which
        receives from a customer an internal account trading requirement for an internal account, wherein the order management system does not permit direct trades between said internal account and a provider external to the customer,
        translates said internal account trading requirement into a holder account trading requirement for a holder account by creating a trading requirement for the holder account that is equivalent to the trading requirement for the internal account, wherein the order management system is configured to use said holder account to trade directly with both said internal account and said external provider, and
        builds an external order based on said holder account trading requirement;
    an order executor processor which
        transmits a set of price quotes for said external order to said customer and,
        responsive to said customer's selection of a winning price quote from said external provider, causes said external order to be filled; and
    an order completer processor which records two executed deals comprising:
        a first executed deal between said holder account and said external provider, said first executed deal corresponding to said filled external order, and
        a second executed deal between said holder account and said internal account.

2. The order management system of claim 1, wherein said order generator builds said external order according to a set of customer preferences.

3. The order management system of claim 2, further comprising a customer preferences database to store said set of customer preferences.

4. The order management system of claim 2, wherein said set of customer preferences comprises at least one of:
    a netting option,
    a preferred provider candidate,
    a maximum price,
    a minimum order size,
    a settlement date restriction,
    a currency designation associated with said external order,
    said customer's location,
    a provider candidate's location,
    a funding amount associated with said external order,
    a provider candidate's transaction history,
    a service level agreement with one of said set of provider candidates, a business volume target associated with one of said set of provider candidates, and a provider candidate's observed performance record.

5. The order management system of claim 1, wherein said winning price quote is selected from a set of price quotes submitted by a set of provider candidates.

6. The order management system of claim 5, wherein said order generator determines said set of provider candidates according to a set of customer preferences.

7. The order management system of claim 6, wherein said set of customer preferences comprises at least one of:

a netting option,
a preferred provider candidate,
a maximum price,
a minimum order size,
a settlement date restriction,
a currency designation associated with said external order,
said customer's location,
a provider candidate's location,
a funding amount associated with said external order,
a provider candidate's transaction history,
a service level agreement with one of said set of provider candidates,
a business volume target associated with one of said set of provider candidates, and
a provider candidate's observed performance record.

8. The order management system of claim 1, wherein said order generator builds said external order according to a set of system preferences.

9. The order management system of claim 8, wherein said set of system preferences includes at least one of:

a netting option,
a preferred provider candidate,
a maximum price,
a minimum order size,
a settlement date restriction,
a currency designation associated with said external order,
said customer's location,
a provider candidate's location,
a funding amount associated with said external order,
a provider candidate's transaction history,
a service level agreement with one of said set of provider candidates,
a business volume target associated with one of said set of provider candidates, and
a provider candidate's observed performance record.

10. The order management system of claim 1, wherein said order executor retrieves said set of price quotes from a set of provider candidates.

11. The order management system of claim 1, in which said order generator receives an external account trading requirement for an external account, and builds a market order based on said external account trading requirement;

said order executor receives and transmits to said customer a price quote responsive to said market order, and causes said market order to be filled by a second external provider; and said order completer records a third executed deal between said second external provider and said external account.

12. The order management system of claim 11, wherein said order generator nets together said external order and said market order, thereby forming a netted market order, and sends said netted market order to a set of provider candidates.

13. The order management system of claim 12, wherein said winning provider and said second winning provider are the same.

14. The order management system of claim 1, further comprising a data communications link to an asset trading execution system.

15. The order management system of claim 14, wherein said order executor receives said set of price quotes from said asset trading execution system via said data communications link.

16. The order management system of claim 14, wherein said order executor causes said external order to be filled by said asset trading execution system.

17. The order management system of claim 1, further comprising an interface to a customer trading system.

18. The order management system of claim 17, wherein said order executor transmits said set of price quotes to said customer trading system via said interface.

19. The order management system of claim 17, wherein said order executor receives said offer to deal from said customer trading system via said interface.

20. The order management system of claim 17, wherein said internal account trading requirement is received from said customer via said interface.

21. The order management system of claim 17, further comprising a customer session manager, coupled to said interface, and configured to communicate with said customer trading system, via said interface, according to a messaging protocol.

22. The order management system of claim 14, wherein said order executor sends a request for quotes to said asset trading execution system via said data communications link.

23. The order management system of claim 1, wherein said set of price quotes are delivered to said order executor in a substantially continuous stream.

24. The order management system of claim 1, further comprising a requirements database to store said internal account trading requirement.

25. The order management system of claim 24, wherein said order generator stores said internal account trading requirement in said requirements database.

26. The order management system of claim 24, wherein said order completer retrieves said internal account trading requirement from said requirements database.

27. The order management system of claim 1, wherein said order generator establishes a relationship between said internal account trading requirement and said holder account trading requirement.

28. The order management system of claim 27, further comprising a relationship database to store said relationship.

29. The order management system of claim 28, wherein said order completer retrieves said relationship from said relationship database.

30. The order management system of claim 1, wherein said order completer records said second executed deal using a price that includes a predefined spread.

31. The order management system of claim 30, further comprising a spreads database to store said predefined spread.

32. The order management system of claim 1, wherein said order completer generates an execution record for said first executed deal.

33. The order management system of claim 32, further comprising an order execution records database to store said execution record.

34. The order management system of claim 1, wherein said order completer generates an execution record for said second executed deal.

35. The order management system of claim 34, further comprising an order execution records database to store said execution record.

36. The order management system of claim 34, wherein said order completer sends said execution record to said customer.

37. An order management system for executing trades, comprising:
A database comprising records representing
a set of one or more internal accounts for settling funds associated with internal trades, and
a set of one or more holder accounts for settling funds associated with internal trades and external trades;
an order generator processor which
receives from a customer an internal account trading requirement for an internal account, wherein the order management system does not permit direct trades between said internal account and a provider external to the customer,
translates said internal account trading requirement into a holder account trading requirement for a holder account by creating a trading requirement for the holder account that is equivalent to the trading requirement for the internal account, wherein the order management system is configured to use said holder account to trade directly with both said internal account and said external provider, and
builds an external order based on said holder account trading requirement;
an order executor processor which automatically selects a winning price quote from said external provider for said external order and causes said external order to be filled by an asset trading execution system; and
an order completer processor which records two executed deals comprising:
a first executed deal between said holder account and said external provider, said first executed deal corresponding to said filled external order, and
a second executed deal between said holder account and said internal account.

38. In an order management system comprising a set of one or more internal accounts for settling funds associated with internal trades, a set of one or more holder accounts for settling funds associated with internal trades and external trades, an order generator, an order executor, an order completer and an interface to a customer trading system, a computer-implemented method for processing trade requests, comprising:
receiving, via the interface to the customer trading system, an internal account trading requirement for an internal account, wherein the order management system does not permit direct trades between said internal account and a provider external to the customer;
using the order generator to translate said internal account trading requirement into a holder account trading requirement for a holder account, and to build an external order based on said holder account trading requirement, wherein, the translation includes creating a trading requirement for the holder account that is equivalent to the trading requirement for the internal account, and the order management system is configured to use said holder account to trade directly with both said internal account and said external provider;
using the order executor to transmit a set of price quotes for said external order to said customer trading system and to fill said external order responsive to receiving from said customer trading system a selection of a winning price quote from said external provider; and
using the order completer to record two executed deals comprising
a first executed deal between said holder account and said external provider, said first executed deal corresponding to said filled external order, and
a second executed deal between said holder account and said internal account;
wherein all of the steps above are performed by a programmed computer.

39. The method of claim 38, further comprising using the order generator to build said external order according to a set of customer preferences.

40. The method of claim 39, further comprising:
providing a customer preferences database; and
using the order generator to retrieve said set of customer preferences from said customer preferences database.

41. The method of claim 39, wherein said set of customer preferences comprises at least one of:
a netting option,
a preferred provider candidate,
a maximum price,
a minimum order size,
a settlement date restriction,
a currency designation associated with said external order,
said customer's location,
a provider candidate's location,
a funding amount associated with said external order,
a provider candidate's transaction history,
a service level agreement with one of said set of provider candidates,
a business volume target associated with one of said set of provider candidates, and
a provider candidate's observed performance record.

42. The method of claim 38, wherein said winning provider is selected from a set of provider candidates.

43. The method of claim 42, further comprising using the order generator to determine said set of provider candidates according to a set of customer preferences.

44. The method of claim 43, wherein said set of customer preferences comprises at least one of:
a netting option,
a preferred provider candidate,
a maximum price,
a minimum order size,
a settlement date restriction,
a currency designation associated with said external order,
said customer's location,
a provider candidate's location,
a funding amount associated with said external order,
a provider candidate's transaction history,
a service level agreement with one of said set of provider candidates,
a business volume target associated with one of said set of provider candidates, and
a provider candidate's observed performance record.

45. The method of claim 38, wherein said order generator builds said external order according to a set of system preferences.

46. The method of claim 45, wherein said set of system preferences includes at least one of:
a netting option,
a preferred provider candidate,
a maximum price,
a minimum order size,
a settlement date restriction, a currency designation associated with said external order,
said customer's location,
a provider candidate's location,
a funding amount associated with said external order,
a provider candidate's transaction history,
a service level agreement with one of said set of provider candidates,
a business volume target associated with one of said set of provider candidates, and
a provider candidate's observed performance record.

47. The method of claim 38, further comprising receiving said set of price quotes from a set of provider candidates.

48. The method of claim 38, further comprising:
receiving, via the interface to the customer trading system, an external account trading requirement for an external account, wherein the order management system is configured to use said external account to trade directly with a second external provider;
using the order generator to build a market order based on said external account trading requirement;
using the order executor to transmit to said customer trading system a price quote responsive to said market order to receive from said customer trading system a selection of a second winning price quote from said second external provider; and
using the order completer to record a third executed deal between said second external provider and said external account.

49. The method of claim 48, further comprising:
using the order generator to net together said external order and said market order, thereby forming a netted market order, and
using the order executor to send said netted market order to a set of provider candidates.

50. The method of claim 48, wherein said external provider and said second external provider are the same.

51. The method of claim 38, further comprising providing a data communications link to an asset trading execution system.

52. The method of claim 51, further comprising receiving said set of price quotes from said asset trading execution system via said data communications link.

53. The method of claim 38, wherein the order executor transmits said set of price quotes to said customer trading system via said interface.

54. The method of claim 38, wherein the order executor receives said set of price quotes as a substantially continuous stream.

55. The method of claim 38, further comprising providing a requirements database and retrieving said internal account trading requirement from said requirements database.

56. The method of claim 38, further comprising:
providing a relationship database;
establishing a relationship between said internal account trading requirement and said holder account trading requirement; and
creating a record in the relationship database representing the relationship.

57. The method of claim 38, wherein the order completer records said second executed deal using a price that includes a predefined spread.

58. The method of claim 38, further comprising:
providing a spreads database; and
using the order completer to retrieve said predefined spread from said spreads database.

59. The method of claim 38, wherein the order executor generates a first execution record for said first executed deal and sends the execution record to said customer trading system via the interface.

60. The method of claim 38, wherein the order executor generates execution record for said second executed deal and sends the execution record to said customer trading system via the interface.

* * * * *